United States Patent [19]

Nezu et al.

[11] 3,718,762

[45] Feb. 27, 1973

[54] PULSE TRANSMITTING APPARATUS

[75] Inventors: Kazuo Nezu, Hachioji; Ziro Imabayashi, Murayama-gun; Kazutaka Watanabe, Koganei; Tadamitsu Iritani, Shimorenjaku; Kouju Kataoka, Shimorenjaku; Michio Yoshioka, Shimorenjaku, all of Japan

[73] Assignee: Yokogawa Electric Works, Ltd., Tokyo, Japan

[22] Filed: July 16, 1970

[21] Appl. No.: 55,412

[52] U.S. Cl. ....................................... 178/68

[51] Int. Cl. ....................................... H04l 25/08

[58] Field of Search ....................... 178/68, 88 R

[56] References Cited

UNITED STATES PATENTS

| | | | |
|---|---|---|---|
| 2,995,667 | 8/1961 | Clapper et al. | 178/68 UX |
| 3,359,433 | 12/1967 | Thauland | 178/68 X |
| 3,465,101 | 9/1969 | Christian et al. | 178/68 |
| 3,514,690 | 5/1970 | Quiros | 178/68 |
| 3,497,619 | 2/1970 | Babcock | 178/68 |

*Primary Examiner*—Robert L. Richardson
*Attorney*—Chittick, Pfund, Birch, Samuels & Gauthier

[57] ABSTRACT

A pulse transmitting apparatus comprising a first transmission line connected to a current drive circuit at one end, a second transmission line stranded with the first and having an end connected to a receiver circuit located adjacent the drive circuit, and a pair of serial connected switches at the transmitting end of the apparatus for connecting together the other ends of the first and second transmission lines and sending a current pulse signal to the receiver circuit. The switches are operated simultaneously in response to an input signal and the apparatus contains means for absorbing pulses reflected back from the receiving end to the transmitting end of the apparatus.

6 Claims, 10 Drawing Figures

KAZUO NEZU, ZIRO IMABAYASHI, INVENTOR S
KAZUTAKA WATANABE, TADAMITSU IRITANI,
KOUJU KATAOKA, MICHIO YOSHIOKA
BY
Chittick, Pfund, Birch, Samuels & Gauthier KAZUO NEZU, ZIRO IMABAYASHI, INVENTORS
KAZUTAKA WATANABE, TADAMITSU IRITANI,
KOUJU KATAOKA, MICHIO YOSHIOKA
BY
Chittick, Pfund, Birch, Samuels & Gauthier KAZUO NEZU, ZIRO IMABAYASHI, KAZUTAKA WATANABE, TADAMITSU IRITANI, KOUJU KATAOKA, MICHIO YOSHIOKA *INVENTORS*

BY

Cltlick, Pfund, Birch, Samuels & Gauthier

PULSE TRANSMITTING APPARATUS

BACKGROUND OF THE INVENTION

This invention relates to a pulse transmitting apparatus wherein a switch in the input is operated by a pulse signal so as to transmit the pulse to a remote receiving station over a transmission circuit by means of a current signal.

SUMMARY OF THE INVENTION

It is an object of this invention to provide a novel pulse transmitting apparatus employing a current driven transmission system including an input switch element actuated by a pulse signal for interrupting a current signal to transmit it to a remote receiving station over a transmission line.

Another object of this invention is to provide a novel pulse transmission apparatus capable of transmitting the pulse over long distance with small delay time and low power consumption.

Further object of this invention is to provide a pulse transmission apparatus wherein the pulse signal is transmitted over a three wire type transmission line.

Yet another object of this invention is to transmit a high speed pulse over long distance with extremely low power and to efficiently transmit the signal even when the transmission line is not perfectly matched.

Another object of this invention is to provide a reliable transmission apparatus of simple construction by employing an integrated circuit of a predetermined constant.

Still further object of this invention is to provide a new and improved pulse transmission apparatus wherein the output of a constant current circuit is sent out to the transmission line by a switch intermittently operated by a pulse signal toward a terminal resistance of the receiving end and wherein the transmission of the pulse signal can be made with an extremely low power by cutting out the terminal resistance during the period in which a signal is sent out from the constant current circuit thus improving the signal level in the transmission circuit.

In accordance with one embodiment of this invention there is provided a high speed pulse transmitting apparatus comprising a drive circuit to generate a current signal, a transmission line, an input switching circuit including a switching element controlled by an input pulse signal to interrupt the current signal to form a current pulse signal and to apply the same to the transmission line, and a receiver circuit connected to the transmission line to receive the current pulse signal transmitted over the transmission line to produce an output signal corresponding to the current pulse signal.

In accordance with another embodiment of this invention there is provided a pulse transmitting apparatus comprising a pulse signal transmitting circuit including a first switch rendered conductive by an input pulse signal and a second switch rendered nonconductive by the input signal, a receiver circuit to receive the pulse signal from the transmitting circuit, first and second transmission lines interconnecting the transmitting circuit and the receiver circuit, a terminal resistor connected to the pulse transmitting circuit to absorb the reflected pulse signal, a third transmission line connected between the terminal resistor and the receiver circuit in parallel with the first and second transmission lines and means to disconnect the terminal resistor from the second transmission line when transmitting the pulse signal thus decreasing loss of the pulse current and to connect the terminal resistor to the second transmission line when the pulse reflected by the receiver circuit reaches the transmitting circuit.

BRIEF DESCRIPTION OF THE DRAWING

The invention can be more fully understood from the following detailed description when taken in conjunction with the accompanying drawings in which.

DESCRIPTION OF THE PREFERRED EMBODIMENTS

Figure 1:
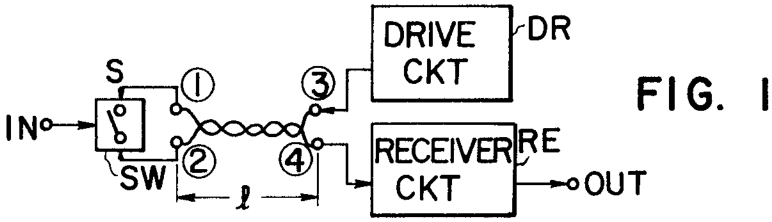
FIG. 1 is a block diagram showing the construction of the pulse transmission apparatus embodying the invention.

Referring now to the block diagram of FIG. 1 diagrammatically illustrating a construction of the novel high speed pulse transmission apparatus there are shown a pulse input terminal IN, a pulse output terminal OUT, an input switch member S, a transmission line or circuit *l*, a drive circuit DR (actually a source of supply) and a receiver circuit RE.

Input switch member S is connected across terminals 1 and 2 of the transmission line *l*. Drive circuit DR is connected to a terminal 3 of transmission line *l*, and switch S and drive circuit DR cooperate to constitute an emitter follower circuit to pass current through transmission line *l*. A receiver circuit RE is connected to a terminal 4 of transmission line *l* and the output terminal of receiver circuit RE is connected to output terminal OUT for the pulse signal.

When a pulse signal is impressed upon input terminal IN, the contact of a switch SW of input switch member S is closed to send out a current signal from drive circuit DR to transmission line *l*. More particularly, the current signal from drive circuit DR drives receiver circuit RE through switch SW of input switch member S to send out a corresponding pulse signal to output terminal OUT from receiver circuit RE.

In the absence of the pulse signal at the input terminal IN, since switch S of the input switch member S is not closed no current signal is sent to transmission line $l$ from drive circuit DR so that receiver circuit RE does not receive the current signal thus producing no pulse signal at the output terminal OUT.

In this manner, switch SW is closed while a pulse signal is being impressed upon switch member S, so that a current signal corresponding to the pulse signal is sent to transmission line $l$ which is detected by receiver circuit RE, thus sending out a pulse signal from receiver circuit RE through output terminal OUT. Where the length of the transmission line is short, the drive circuit may be located on the side of switching member S.

Figure 2:
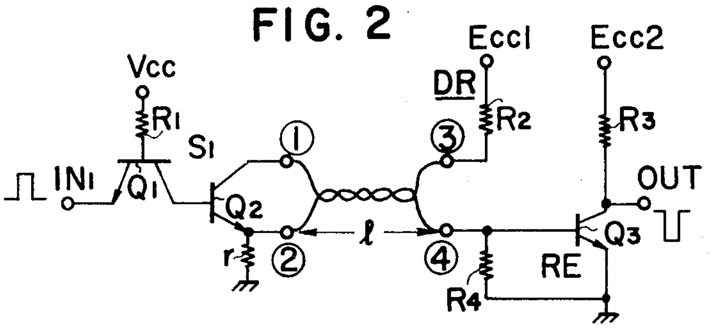
FIG. 2 shows connection diagram of the novel transmission apparatus employing semiconductor elements.

FIG. 2 shows a connection diagram of one embodiment of this invention wherein the high speed pulse transmission apparatus is comprised by semiconductor elements. In FIG. 2, elements corresponding to those of FIG. 1 are designated by the same reference symbols. Transistors $Q_1$ and $Q_2$ comprise a switching element corresponding to switch SW of input switch member S shown in FIG. 1. These transistors are biased by a bias source Vcc. Where a common line is used to connect with drive circuit DR it is not necessary to use a resistor $r$, whereas in case where such a common line is not used it is essential to use resistor $r$ in order to apply a reference potential to the switch member. Drive circuit DR is comprised by a resistor $R_2$ with one terminal connected to a DC source $Ecc_1$. Receiver circuit RE is comprised by a transistor $Q_3$ and a pair of resistors $R_3$ and $R_4$. Here, resistor $R_4$ is used to protect transistor $Q_3$ and to absorb the charges on the transmission line and the transistor but not for the purpose of matching.

In the absence of a pulse signal at the input terminal $IN_1$ and hence when it has a "0" level the base current of transistor $Q_1$ flows through its emitter circuit so that transistor $Q_2$ is in its OFF state and the input switch member $S_1$ is maintained off. When a pulse signal is impressed upon input terminal $IN_1$ to change its level from "0" to "1" the base current of transmistor $Q_1$ which has been flowing to the emitter electrode will be switched to the collector electrode thus turning ON transistor $Q_2$. As a result, current flows through transistor $Q_2$ from drive circuit DR and this current flows into the base electrode of transistor $Q_3$ in receiver circuit RE to turn ON the transistor $Q_3$. Conduction of transistor $Q_3$ instantly grounds the output terminal OUT to change its level from "1" to "0". When the pulse signal is removed from input terminal $IN_1$ to change its level to "0" reverse operation is performed to cut OFF transistor $Q_2$. In response thereto, transistor $Q_3$ is also rendered OFF. As a result, the voltage of a DC source $Ecc_2$ is applied to output terminal OUT via a resistor $R_3$ to change the level of output terminal from "0" to "1", thus producing a pulse signal. Resistor $R_3$ in the receiver circuit RE may be substituted by a Darlington circuit to improve the build-up characteristic of the output pulse signal.

Figures 3, 4:
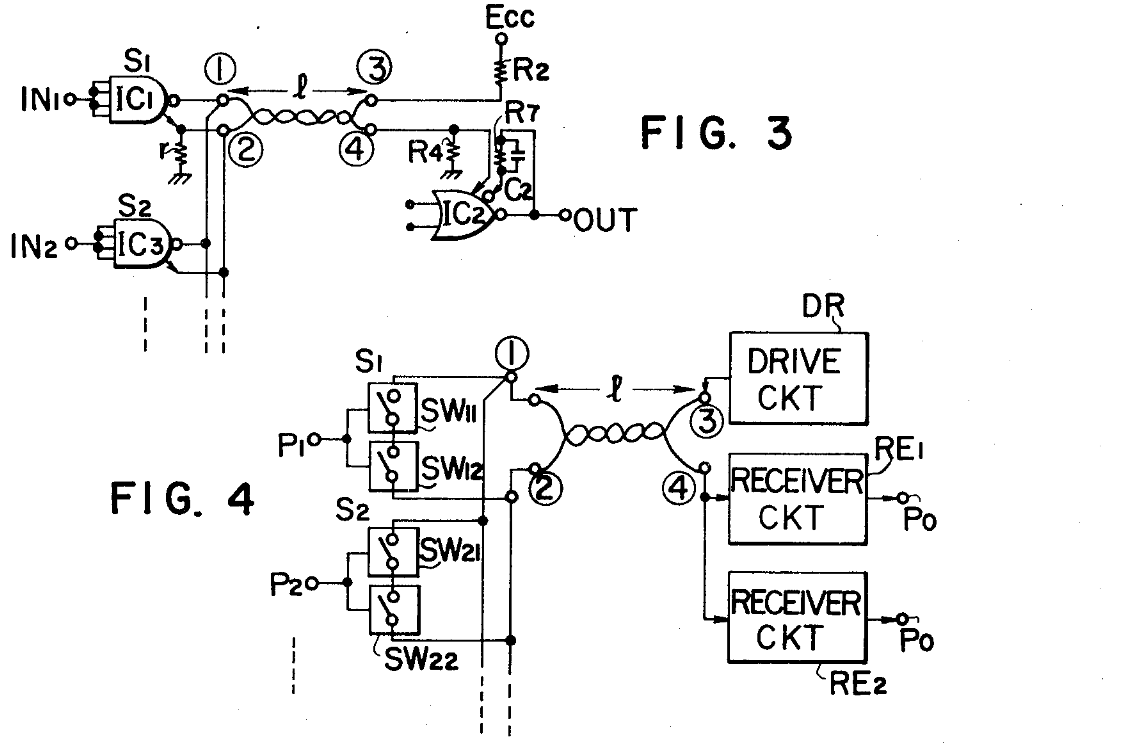
FIG. 3 shows a modified embodiment of this invention employing integrated circuits.
FIG. 4 shows a block diagram of another embodiment of this invention utilizing duplicated circuits at the important portions of the transmission apparatus.

FIG. 3 shows a modified embodiment of this invention in which integrated circuits are used. In the circuit shown in FIG. 3, input switch members $S_1$ and $S_2$ are respectively comprised by integrated circuits $IC_1$ and $IC_3$ of TTL NAND gate expander, and the input terminals of these integrated circuits are connected to a common input terminal to receive a pulse signal. Output terminals of the integrated circuits and the terminal of the expander are connected across terminals 1 and 2 of the transmission circuit to comprise a switch circuit. The receiver circuit utilizes an integrated circuit of TTL NAND gate expander, the expander terminal being connected to the terminal 4 of transmission line $l$ to provide a pulse signal from output terminals. Drive circuit DR includes a resistor $R_2$ connected to the DC source Ecc as in the case of FIG. 2. The embodiment shown in FIG. 3 operates in the same manner as that shown in FIG. 1.

The high speed pulse transmission apparatus constructed as above described is generally utilized in such a manner that a plurality of parallel connected input switch members are connected with a set consisting of a transmission line, a drive circuit and a receiver circuit to sequentially transmit a plurality of pulse signals on a time division basis so that failure of the contact of any one of the input switch members disenables all other input switches connected in parallel therewith.

FIG. 4 shows an improved embodiment of this invention wherein input switch members and receiver circuits are provided in duplicate thus improving the reliability of the high speed pulse transmitting apparatus.

In FIG. 4, $P_1$, $P_2$ . . . are input terminals for the pulse signal and $P_0$ the output terminal. A first input switch member $S_1$ comprises serially connected switches $SW_{11}$ and $SE_{12}$ while a second input switch member $S_2$ comprises serially connected switches $SW_2$ and $SW_{22}$. Similar to the previous embodiment, $l$ represents a transmission line, DR a drive circuit and $RE_1$ and $RE_2$ receiver circuits.

Each of input switch members $S_1$ and $S_2$ are connected across terminals 1 and 2 of the transmission line $l$. Drive circuit DR is connected to terminal 3 of the transmission line $l$ and receiver circuits $RE_1$ and $RE_2$ are connected in parallel to terminal 4 of the transmission line 1. Output terminals of receiver circuits $RE_1$ and $RE_2$ are connected to output terminals $P_0$ for the pulse signal.

Switches $SW_{11}$ and $SW_{12}$ of input switch member are operated simultaneously by the same pulse signal impressed upon input terminal $P_1$. In the same manner, switches $SW_{21}$ and $SW_{22}$ are operated simultaneously by the same pulse signal impressed upon input terminal $P_2$. Pulse signals are sequentially impressed upon input terminals $P_1$ and $P_2$ on a time division basis to send out corresponding current signals to receiver circuits $RE_1$ and $RE_2$ from the drive circuit DR over transmission line $l$.

Upon application of a pulse signal upon input terminal $P_1$, contacts of switches $SW_{11}$ and $SW_{12}$ of the switch member $S_1$ are closed to supply a current signal to receiver circuits $RE_1$ and $RE_2$ from drive circuit over transmission line $l$ to supply corresponding pulses to output terminal $P_0$ from receiver circuits $RE_1$ and $RE_2$. In the absence of the pulse signal on input terminal $P_1$, switches $SW_{11}$ and $SW_{12}$ of the switch circuit will not be closed so that drive circuit will not send the current signal to receiver circuit $RE_1$ and $RE_2$ over the transmission circuit, thus producing no pulse signal at the output terminal $P_0$.

In the same manner the input pulse signal closes the switches of the switch member during its period of duration to control sending out of the current signal from the drive circuit to the transmission circuit so that by detecting the transmitted current signal by the receiver circuit a pulse signal corresponding to the input pulse can be obtained.

Since the input pulse signal impressed upon switch members $S_1$ and $S_2$ connected in parallel across terminals 1 and 2 of transmission line $l$ is given on the time division basis it is possible to transmit a plurality of input pulse signals by means of a set consisting of drive circuit, a receiver circuit and a transmission line.

Since each input switch member is comprised by two serially connected switches (for the purpose of providing the fail-safe feature in case of the failure of one switch in its opened condition) even if one of the switches fails during its ON state, there is no fear of short circuiting the entire switching member thus giving no adverse effect upon the transmission line. For this reason, the transmission line can effectively transmit the pulse signal of the other input switch member. Further, since two receiver circuits $RE_1$ and $RE_2$ are also connected in parallel even when one of them becomes out of order, reception of the pulse signal can be assured.

As above described since in the embodiment shown in FIG. 4 switch members and receiver circuits which are liable to failure are provided in duplicate, failure of either one of them does not interrupt the operation of the transmission system, thus greatly improving its reliability.

Figure 5:
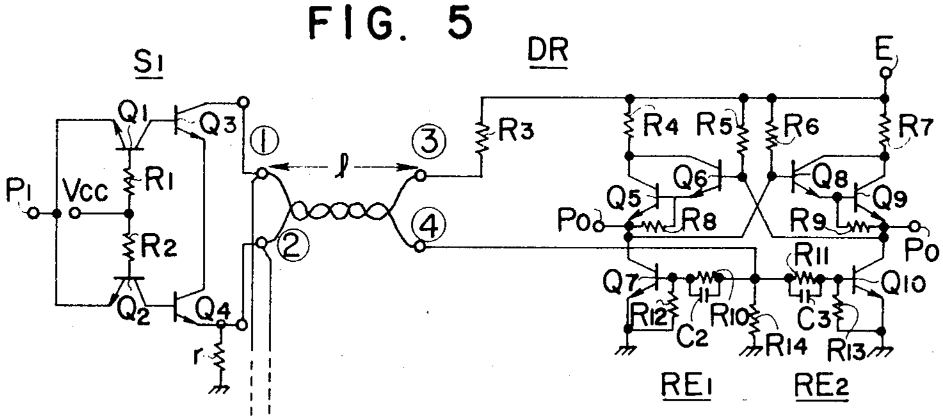
FIG. 5 shows a detailed connection of the circuit shown in FIG. 4 in which semiconductor elements are used.

FIG. 5 shows a modification of FIG. 4 wherein the switches are comprised by semiconductor elements. In FIG. 5, elements corresponding to those shown in FIG. 4 are designated by the same symbols in order to simplify the description. Transistors $Q_1$, $Q_3$, $Q_2$ and $Q_4$ are switching elements corresponding to switches $SW_{11}$ and $SW_{12}$, respectively of FIG. 4, and are biased by a bias source Vcc. Drive circuit DR comprises a resistor $R_3$ with one end connected to a DC source E. Receiver circuit $RE_1$ comprises transistors $Q_5$, $Q_6$ and $Q_7$, resistors $R_4$, $R_5$, $R_8$, $R_{10}$ and $R_{12}$ and capacitor $C_2$ whereas receiver circuit $RE_2$ comprises transistors $Q_8$, $Q_9$ and $Q_{10}$, resistors $R_6$, $R_7$, $R_9$, $R_{11}$ and $R_{13}$ and capacitor $C_3$.

In the absence of a pulse signal at input terminal $P_1$ so that its level is at "0", since the base current of transistors $Q_1$ and $Q_2$ flow through their respective emitter circuits transistors $Q_3$ and $Q_4$ are maintained OFF whereby switches $SW_{11}$ and $SW_{12}$ are in their opened state. Where a pulse signal is applied to input terminal $P_1$ to change its level from "0" to "1" the base current which has been flowing through the emitter electrodes of transistors $Q_1$ and $Q_2$ is switched to their collector electrodes to turn ON transistors $Q_3$ and $Q_4$. Consequently, the drive circuit supplies current to transmission line $l$ through transistors $Q_3$ and $Q_4$, said current being supplied to the base electrodes of transistors $Q_7$ and $Q_{10}$ of receiver circuits $RE_1$ and $RE_2$ respectively, thus turning ON these transistors. When transistors $Q_7$ and $Q_{10}$ are turned ON, respective Darlington circuits comprising transistors $Q_5$, $Q_6$ and transistor $Q_8$, $Q_9$ are instantly interrupted to change the level at output terminal $P_0$ from "1" to "0" to produce an output pulse. When the pulse signal on input terminal $P_1$ disappears to change its level from "1" to "0" an opposite operation is performed to turn OFF transistors $Q_3$ and $Q_4$ and hence transistors $Q_7$ and $Q_{10}$. As a result, transistors $Q_5$, $Q_6$ and $Q_8$, $Q_9$ comprising the Darlington circuits become ON to change the level of the output terminal $P_0$ to "1".

Again, as receiver circuits $RE_1$ and $RE_2$ are connected in parallel to transmission line $l$ even when either one of them fails, the transmission line $l$ is protected against short circuit by resistors $R_{10}$ and $R_{11}$ in circuit with the base circuits. Thus as long as the other receiver circuit remains normal, the operation of the transmission apparatus can be ensured.

In the circuit shown in FIG. 5, respective Darlington circuits of receiver circuits $RE_1$ and $RE_2$ are normally maintained conductive but are interrupted only when a pulse signal is impressed upon the input terminal to change its level from "1" to "0".

In the circuit shown in FIG. 5, where the length of the transmission line $l$ is short bias source V$cc$ and DC source E may be combined into a single source in which case resistor r in the switching member may be eliminated. In addition, where drive circuit DR is provided on the side of the input switch member it is not only possible to improve the noise resistant characteristics caused by the common line but also to eliminate resistor $r$.

Figure 6:
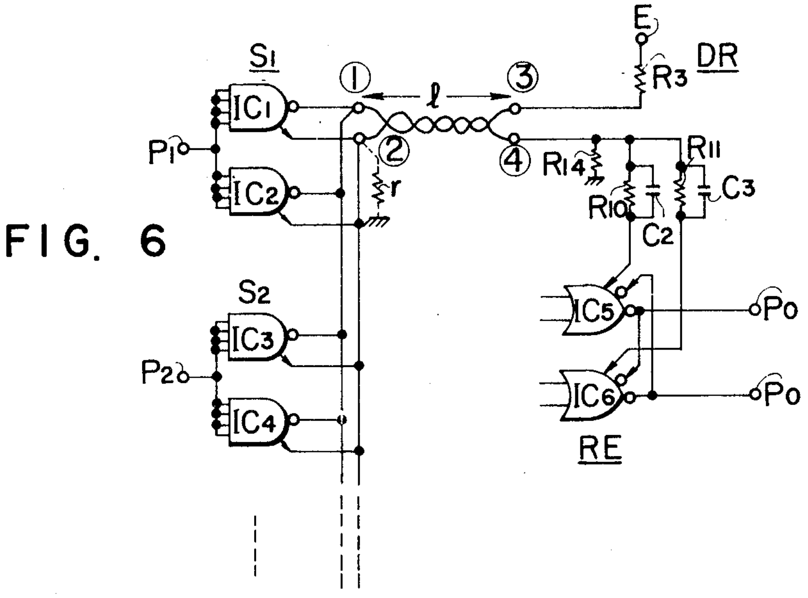
FIG. 6 shows a circuit similar to that shown in FIG. 5 employing integrated circuits.

FIG. 6 shows a connection diagram of a modification of FIG. 4 wherein integrated circuits are used. In the circuit shown in FIG. 6, switches $SW_{11}$ and $SW_{12}$ in the switch member $S_1$ are replaced by TTL NAND gate expanders $IC_1$ and $IC_2$ of integrated circuits, respectively, and their inputs are connected to a common pulse input terminal $P_1$ while output terminals of integrated circuits and the expander terminals are connected in parallel across terminals 1 and 2 of transmission line $l$ thus constituting switching circuits. Similarly, switches $SW_{21}$ and $SW_{22}$ of the switch member $S_2$ are respectively substituted by TTL NAND gate expanders $IC_3$ and $IC_4$ of integrated circuits to comprise switching circuits. Receiver circuits $RE_1$ and $RE_2$ utilize TTL NAND gate expanders $IC_5$ and $IC_6$ of the integrated circuits and the expander terminals are connected to terminal 3 of the transmission line $l$ respectively through parallel combinations of resistor $R_{10}$ and capacitor $C_2$ and resistor $R_{11}$ and capacitor $C_3$. Output terminals of the integrated circuits are connected to output terminals $P_0$.

Drive circuit DR includes a resistor $R_3$ connected to a DC source E similar to that shown in FIG. 5 and the high speed pulse transmitting apparatus operates in the same manner as that shown in FIG. 4.

Since the novel high speed pulse transmitting apparatus shown in various embodiments utilizes a current mode and a current driven transmission system it is move advantageous than the prior art pulse transmission system of the voltage mode in the following points.

1. Line current is small:

For example, under transmission conditions of pulse width : 125ns; transmission distance : 20m; inducing line : 25 pairs; and induced lines : one pair, the voltage mode system requires a current of 53mA on the transmission side and of 40mA on the reception side, whereas the current mode system requires a current of only 8mA on the transmission side and of only 5mA on the reception side.

2. Power consumption is low:

Under the transmission condition described above, the voltage mode system requires powers of 19.5 watts (false line) and 3.2 watts (truth line) whereas the current mode system requires powers of only 3.2 watts (false) and 1.6 watts (truth).

3. Build-up time and build-down time of the pulse are short : Under the same transmission conditions, the voltage mode system requires a pulse build-up time of 60ns and a pulse build-down time of 100ns, whereas the current mode system requires only 20ns for both build-up and build-down.

4. Transmission delay time is short :

Under the same transmission conditions, in the voltage mode system the delay time amounts to 65ns, but in the current mode system, the delay time is only 30ns.

5. The noise margin is large :

Under the same transmission conditions, with the voltage mode system the noise margin equals 45 percent on the transmission side (line false) and 20 percent (line truth) but in the current mode system, the noise margin equals 55 percent on the transmission side (line false) and 80 percent on the receiving side (line truth).

In this manner, the current mode system manifests desirable characteristics for the long distance transmission of high speed pulses. Thus, by the proper selection of the pulse width it is possible to transmit the pulse over a long distance of several killometers.

Figure 7:
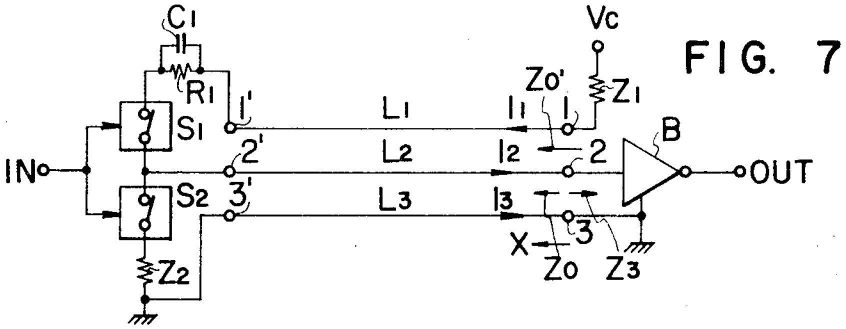
FIG. 7 shows a connection diagram of another embodiment of this invention utilizing a three wire type transmission circuit.

FIG. 7 shows a connection diagram of one embodiment of this invention utilizing a three wire type pulse transmission line. In FIG. 7, a source terminal is designated by Vc, and the line matching impedance by $Z_1$. $L_1$, $L_2$ and $L_3$ are transmission lines. Of these, lines $L_1$ and $L_2$ are stranded with a short pitch and $L_3$ is disposed close to stranded lines $L_1$ and $L_2$ or stranded thereabout with a long pitch. A parallel connected current regulator resistor $R_1$ and a speed-up capacitor $C_1$ are connected between switch member $S_1$ and one end 1' of line $L_1$. IN represents the input terminal for the pulse signal, and OUT the output terminal for the pulse signal. Switch $S_1$ becomes ON when a signal is impressed upon input terminal IN whereas switch $S_2$ is turned OFF under the same condition. Switch $S_2$ is grounded via a matching impedance $Z_2$ and a receiver circuit B having an input impedance $Z_3$ is connected to the opposite terminals 2 and 3 of lines $L_2$ and $L_3$.

Source terminal Vc is connected to one terminal of switch $S_1$ through line matching impedance $Z_1$, transmission line $L_1$ and parallel connected resistor $R_1$ and capacitor $C_1$. Switches $S_1$ and $S_2$ are connected in series, the opposite terminal of switch $S_2$ being grounded through matching impedance $Z_2$ as above described. The juncture between switches $S_1$ and $S_2$ is connected to the input terminal of receiver circuit B through transmission line $L_2$. The grounded terminal of the matching impedance $Z_2$ is connected to the grounded terminal of receiver circuit B through transmission line $L_3$, while the output terminal of receiver circuit B is connected to output terminal OUT. Where source terminal Vc connected connected to a source of constant current, current adjusting resistor $R_1$ may be omitted.

The pulse transmitting apparatus shown in FIG. 7 operates as follows :

Upon application of a positive pulse signal upon input terminal IN switch $S_1$ is rendered ON, whereas switch $S_2$ OFF so that current flows through transmission line $L_2$ via transmission line $L_1$ and switch $S_1$ to provide current $I_2$ at terminal 2 of line $L_2$. Let us consider the conditions across terminals 1 and 1' of line $L_1$ and across terminals 2 and 2' of line $L_2$ under a transcient condition caused by the application of a pulse signal upon input terminal IN. Under these conditions, at any point on lines $L_1$ and $L_2$ currents $I_1$ and $I_2$ have the same magnitude but are dephased by 180°. Since lines $L_1$ and $L_2$ are closely coupled between terminals 1, 1' and 2, 2' (because of stranding) the current in line $L_1$ induces current in line $L_2$ and vice versa, and the induced currents have the same direction. Accordingly, by denoting the currents at points on lines $L_1$ and $L_2$ spaced from their terminals 1 and 2 by a distance $x$, and at an instant $t$, by $I_1$ and $I_2$ respectively or by $I_1(x \cdot t)$. $I_2(x \cdot t)$, respectively, an by denoting the induced currents $i_1$ and $i_2$ of lines $L_1$ and $L_2$ by $i_1(x \cdot t)$ and $i_2(x \cdot t)$, respectively, then the transcient current on lines $L_1$ and $L_2$ at a time $t$ may be expressed by $(x \cdot t)$ while the steady state current by $(x \cdot \infty)$ since $t$ is large.

$$I_1(x \cdot t) = (\text{steady state current}) + \{\text{current induced by } I_2(x \cdot t)\}$$
$$= I_1(0,\infty) + i_2(x \cdot t) \quad (1)$$

Similarly $$I_2(x \cdot t) = I_2(0,\infty) + i_1(x \cdot t) \quad (2)$$
$$I_1(x \cdot t) + I_2(x \cdot t) = 0 \quad (3)$$

Considering the line loss, current $I_2(0 \cdot t)$ can be expressed by $$I_2(0 \cdot t) = -\alpha I(0,\infty) \quad (4)$$

where $\alpha$ represent an attenuation factor.

As equation 4 shows, the current loss is compensated for by the induced components expressed by equations 1 and 2. This shows that the novel pulse transmission system of this invention enables low current transmission, or with substantially negligible transmission loss even with a transmission line of substantial length.

Stranded paired lines $L_1$ and $L_2$ between terminals 1, 1' and 2, 2' induce a zero resultant current during signal transmission as shown by equation 3, the adverse effect thereof to another line, that is cross talking and induction noise are reduced to substantially zero. It is clear that any desired number of transmission lines may be connected in parallel according to the novel pulse transmission system.

In this connection, when the input impedance of receiver circuit B is matched with the impedance of the transmission line the reflection of the signal at the terminal 2 of line 2 will be zero so that line $L_3$, switch $S_2$ and matching impedance $Z_2$ act merely as a shield.

Satisfactory transmission under not-matched condition, one of the features of the novel pulse transmission system, will now be described.

When current flows into terminal 2 of line $L_2$ after an interval of time $t_2$ subsequent to the application of a pulse signal upon input terminal IN, the input current to the receiver circuit B will become $I_2(0 \cdot t)$. However, since the input impedance to receiver circuit B equals $Z_3$, the current reflected at terminal 2 is expressed by $$I_3(x \cdot t) = (Z0 - Z3/Z0 + Z3) \cdot I_2(0 \cdot t) \quad (5)$$

where $Z_0$ represents the characteristic impedance of line $L_2$.

Since it is now assumed that $Z_3>Z_0$, $$0<(Z0-Z3/Z0+Z3)<1 \quad (6)$$

Where a switching element is utilized in receiver circuit B, its input impedance $Z_3$ manifests a non-linear characteristic. In such a case, although the input impedance is closely related to the threshold level $I_{TH}$ of the switching element the reflected current is reduced to a lesser value by the reason as described herein below.

It is assumed now that the input impedance to the receiver circuit B has following non-linear characteristic.

When the input current to B is less than $I_{TH}$ $Z_3=\infty$

When the input current to B is above $I_{TH}$ $Z_3=R_3$

It is further assumed that $I_{TH}$ has an amplitude of $l/K$ of the maximum amplitude of the pule signal, Then where $I_2(0\cdot t)<I_{TH}$ $$I_3(x\cdot t)=(Z0-Z3/Z0+Z3)\cdot l/K\cdot I_2(0\cdot t)=l/K\cdot I_2(0\cdot t) \quad (7)$$

If $I_2(0\cdot t)\rhd I_{TH}$, then $$I_3(x\cdot t)=(Z0-R3/Z0+R3)\cdot I_2(0\cdot t) \quad (8)$$

In these both cases, from equations 7 and 8, following relation can be obtained.

$$I_3(x\cdot t)<I_2(0\cdot t_1) \quad (9)$$

This shows that even when the reflection coefficient becomes equal to unity, the reflected current is equal to $l/K$ of the input current. Actually, in most cases $K=5$.

The current reflected at the input terminal of receiver circuit B flows through lines $L_2$ and $L_3$ and does not flow through the other or common line so that this reflected current is zero when the pair of lines $L_2$ and $L_3$ are considered. Thus, this current does not affect another transmission line in any way. This means that, according to this system it is possible to reduce the effect of the reflected current upon another lines to $l/K$ when compared a case wherein the pulse is transmitted under unbalanced condition. When switch $S_2$ is closed to prevent reflection of the reflected current at point 2′ of line 2, line 2 will be terminated by the matching impedance $Z_2$, thus reducing to zero the reflection coefficient at point 2′. When the width of the pulse signal impressed upon input terminal IN is wider than the transmission time of transmission line $L_2$, or when the transmission distance is short, the signal impressed upon the input terminal IN still exists at an instant when the signal reflected at terminal 2 of line $L_2$ arrives at the opposite terminal 2′ so that the input signal and the reflected signal may have opposite directions. As can be noted from equations 7 and 8, since, even under the most adverse condition, the reflected current will be reduced to $l/K$ or caused to have a value $(Z0-R3/Z0+R3)$ by the proper selection of the transmitted current, the reflected current, if it occurs, will not cause any misoperation. Thus it will be noted that provision of transmission line $L_3$ is efficient.

Figure 8:
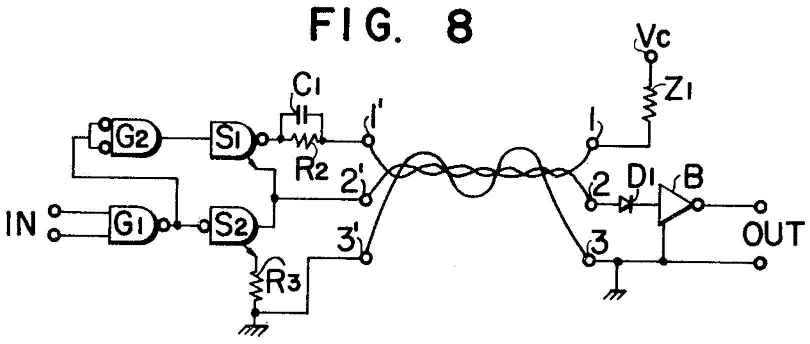
FIG. 8 shows a circuit similar to that shown in FIG. 7 employing integrated circuits.

FIG. 8 shows a modification of the circuit shown in FIG. 7 wherein integrated circuits are replaced for mechanical switches. Thus, in the embodiment shown in FIG. 8, the switches $S_1$ and $S_2$ are comprised by TTL NAND gate expanders of integrated circuits and their drive circuits are comprised by TTL NAND gate circuits $G_1$ and $G_2$, respectively. Input terminals IN are connected to input terminals of NAND gate circuit $G_1$ while the output terminal thereof is connected, on one hand, to the input terminal of NAND gate expander $S_2$ and, on the other hand, to the input terminal of NAND gate expander $S_1$ via NAND gate circuit $G_2$. Output terminals of NAND gate expanders $S_1$ and $S_2$ and expand terminals are connected in series respectively and thence to transmission lines $L_1$, $L_2$ and matching impedance $R_3$. Diode $D_1$ connected to the input terminal of receiver circuit B is a level shift diode. Receiver circuit B comprises a TTL NAND gate expander. It was found that this circuit can transmit pulses satisfactorily over a distance of 150m under conditions of transmission current : 8mA, pulse width : 50ns, build-up and build-down times : 6ns and duty cycle : 50 percent. By increasing the value of the transmitted current it is possible to increase the transmission distance.

As can be noted from the foregoing description this embodiment of this invention provides a novel pulse transmission system capable of transmitting high speed pulse signals over a long distance with extremely low power. Moreover since it is not necessary to provide perfect matching it is possible to readily fabricate the system by using integrated circuits thus providing a novel transmission apparatus of high reliability and simple construction. Since cross talk noise is low it is possible to dispose a plurality of lines in closely juxtaposed relationship which is advantageous to transmit a plurality of parallel signals.

Figure 9:
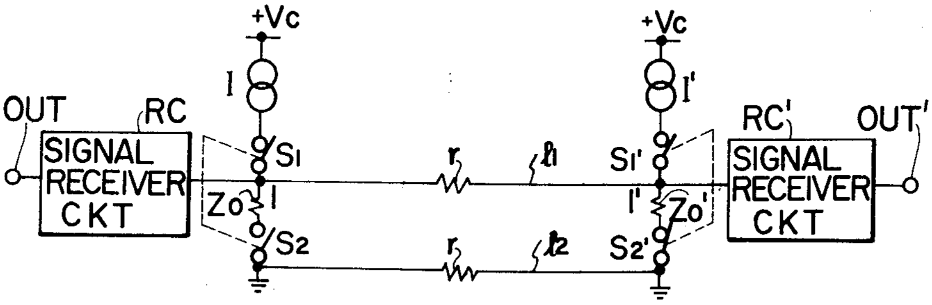
FIG. 9 shows a connection diagram of a modified embodiment of this invention according to which the signal level in the transmission line is improved by cutting off a terminal resistance at the sending end during a period in which a current signal is sent out.

In still further modification of this invention shown in FIG. 9 in which the output terminal of a constant current circuit I is connected to a switch $S_2$ via a switch $S_1$ and a terminal resistor $Z_0$. Similarly, the output terminal of another constant current circuit I′ is connected to a switch $S_2'$ via a switch $S_1'$ and a terminal resistor $Z_0'$. Switches $S_1$ and $S_1'$ are rendered ON or closed when pulse signals are applied whereas switches $S_2$ and $S_2'$ are rendered OFF when they receive pulse signals. Juncture 1 between switch $S_1$ and terminal resistor $Z_0$ is connected to signal receiver circuits RC and RC′ and a transmission line $l_1$ having a resistance r is connected between junctures 1 and 1′. Grounded terminals of switches $S_2$ and $S_2'$ are interconnected by another transmission line $l_2$ having a resistance $r$.

The operation of the embodiment shown in FIG. 9 is as follows. Switches $S_1$ and $S_2$ are interlocked so that upon application of a pulse signal switch $S_1$ is turned ON and switch $S_2$ OFF. Under these conditions, a closed circuit is completed including constant current circuit I, transmission line $l_1$, terminal resistor $Z_0'$ and transmission line $l_2$ to pass the output current from constant current circuit I through terminal resistor $Z_0'$ to create a voltage drop corresponding to the pulse signal across terminal resistor $Z_0'$. This voltage drop is received by receiver circuit RC′ to produce an output signal at output terminal OUT′. Similarly, switches $S_1'$ and $S_2'$ are also interlocked so that upon application of a pulse signal switch $S_1'$ is turned ON and switch $S_2$ OFF to complete a closed circuit including constant current circuit I′, transmission line $l_1$, terminal resistor $Z_0$ and transmission line $l_2$, to create an output signal at output terminal OUT by the operation identical to that described above. Under these circumstance since during transmission of the pulse signal the terminal resistor $Z_0$ on the sending side is interrupted from transmission line $l_1$ by switch $S_2$ and since terminal resistor $Z_0'$ by switch $S_2'$ output currents from constant current circuits I and I′ are supplied to terminal resistors $Z_0$ and $Z_0'$, respectively, on the receiving side without loss thus increasing the signal level. For this reason, even when the transmission distance is increased with accompanying increase in the resistance $r$ of the transmission lines $l_1$ and $l_2$ the effect of the increased resistance can be alleviated.

Figure 10:
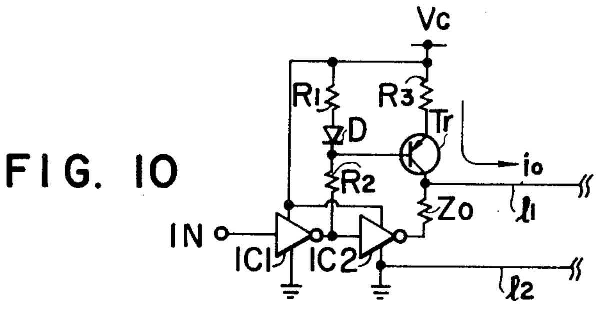
FIG. 10 shows a connection diagram of one example of the pulse transmission circuit employed in the embodiment shown in FIG. 9.

FIG. 10 shows one example of a pulse transmission circuit suitable for use in this invention. In this figure, $IC_1$ and $IC_2$ represent inverter circuits of the open collector type of TTL integrated circuits. $Tr$ represents a PNP-type transistor, D a temperature compensating diode and $R_1$, $R_2$ and $R_3$ resistor, respectively. $Z_0$ represents a terminal resistor, $l_1$ and $l_2$ transmission lines, $Vc$ a source of DC supply and IN an input terminal for a pulse signal.

As shown, input terminal IN is connected to one terminal of terminal resistor $Z_0$ through integrated circuits $IC_1$ and $IC_2$. The juncture between these integrated circuits is connected to source $Vc$ via serially connected resistor $R_1$, diode D and resistor $R_2$. Between the source $Vc$ and the line terminal of terminal resistor $Z_0$ are serially connected resistor $R_3$ and transistor $Ir$. The juncture between diode D and resistor $R_2$ is coupled to the base electrode of transistor $Tr$.

Transistor $Tr$ and resistors $R_1$, $R_2$ and $R_3$ cooperate to form a constant current circuit, the temperature characteristic thereof being compensated for by diode D. When a pulse signal is applied upon input terminal IN to bring it to a high level, the input terminal of integrated circuit $IC_1$ is also broght to the high level so that the output terminal of integrated circuit $IC_1$ becomes a low level. Consequently, current flows through a circuit including DC source $Vc$, resistor $R_1$, diode D and resistor $R_2$ to apply a bias voltage to the base electrode of transistor $Tr$ by the voltage drop created by the current to turn ON transistor $Tr$, thus sending out a constant current $i_0$ from this transistor. Since, at this time, the input terminal of integrated circuit $IC_2$ is at a low level condition, its output terminal assumes a high level so that all output current from transistor $Tr$ is sent to transmission line $l_1$ instead of flowing through terminal resistor $Z_0$. In the absence of a pulse signal on input terminal IN, hence when it is at a low level condition, the input terminal of the integrated circuit $IC_1$ is also at the low level so that the output terminal of integrated circuit $IC_1$ is at a high level. Accordingly, current does not flow through a circuit including resistor $R_1$, diode D and resistor $R_2$ so that no bias voltage is applied to transistor $Tr$ to maintain it in ON state. Thus the transistor is in its OFF state and constant current is not sent out. On the other hand, as the input terminal of integrated circuit $IC_2$ is at the high level its output terminal is at the low level and transmission lines $l_1$ and $l_2$ are terminated by terminal resistor $Z_0$. In this manner, as the phases of the impedances of output terminals of two serially connected integrated circuits $IC_1$ and $IC_2$ are varied oppositely in accordance with the signal impressed upon input terminal IN, these integrated circuits can be operated in the same manner as switches $S_1$, $S_2$ or $S_1'$, $S_2'$ shown in FIG. 9. Accordingly, when the circuit shown in FIG. 10 is connected on each side of transmission lines the circuit shown in FIG. 9 can be obtained capable of effecting bidirection transmission, wherein when one of the constant current circuit associated with the transmission lines is operative the terminal resistor on the opposite side is connected across the lines. In this case, since the transmission line is comprised by the combination of TTL type integrated circuits $IC_1$ and $IC_2$ and transistor $Tr$ operating in the active region extremely high speed switching operation can be provided.

According to this embodiment the pulse signal is transmitted in the form the a constant current and when the signal is sent out the terminal resistor on the transmission side is cut out so that current signal is supplied to the terminal resistor alone on the receiving side thus efficiently utilizing the energy of the pulse. As a consequence, it is possible to transmit the signal over a long distance with a low voltage source and low power transistors. Although the resistance of the transmission line generally increases to an appreciable value with the increase of the length of the line, according to this embodiment as long as the length of the line is a range in which the constant current characteristic of the transmitted signal can be maintained it is possible to always provide an output signal of a constant level across the terminal resistor irrespective of the value of the resistance of the line.

While the invention has been shown and described in terms of some preferred embodiments it should be understood that this invention is by no means limited to these particular embodiments and that many changes and modifications will occur to one skilled in the art within the true spirit and scope of the invention as defined in the appended claims.

What is claimed is:

1. A high speed pulse transmitting apparatus comprising a drive circuit to generate a current signal, a transmission line, an input switching circuit including a plurality of serially connected switching elements adapted to interrupt said current signal to form a current pulse signal and to apply the same to said transmission line in response to being simultaneously operated by an input pulse signal, and a plurality of receiver circuits, each of which is connected to said transmission line to receive said current pulse signal transmitted over said transmission line and adapted to produce an output signal corresponding to said current pulse signal.

2. A pulse transmitting apparatus comprising a pulse signal transmitting circuit, a receiver circuit adapted to receive said pulse signal from said transmitting circuit, a first transmission line interconnecting said transmitting circuit and said receiver circuit for carrying said pulse signal, a terminal resistor connected to said pulse transmitting circuit, a second transmission line connected between said terminal resistor and said receiver circuit in parallel with said first transmission line, and means to disconnect said terminal resistor from said first transmission line when transmitting said pulse signal and to connect said terminal resistor to said first transmission line when said pulse is reflected by said receiver circuit and reaches said transmitting circuit so that said resistor absorbs said reflected pulse.

3. The pulse transmitting apparatus according to claim 2 and further including a constant current source located adjacent said receiver circuit, a third transmission line interconnecting said source with said transmitting circuit and paralleling said first and second transmission lines for providing said transmitting circuit with a current signal, and wherein said transmitting circuit comprises a switch adapted to apply said current signal to said first transmission line in response to an input signal.

4. The pulse transmitting apparatus according to claim 3 wherein said first and third transmission lines are stranded with each other, whereby noise currents from said first and third lines arising from the transmission of said current signal are substantially reduced.

5. A pulse transmitting apparatus comprising a transmission line, a constant current circuit, a terminal resistor associated with said transmission line, a first switch responsive to an input signal to apply the output from said constant current circuit to said transmission line, and a second switch responsive to said input signal to disconnect said terminal resistor from said transmission line.

6. An apparatus for transmitting signals from a first to a second location comprising first and second transmission lines stranded together and extending between said two locations, a drive circuit for applying a current signal to said first line at said second location, a switch at said first location connected between said first and second lines, said switch being adapted to selectively apply said current signal on said first line to said second line in response to an input signal, and a receiver circuit located at said second location and adapted to receive said selectively applied current signal on said second line, whereby noise currents from said first and second stranded transmission lines arising from the transmission of said current signal are substantially reduced.

* * * * *

UNITED STATES PATENT OFFICE
CERTIFICATE OF CORRECTION

Patent No. 3,718,762 Dated February 27, 1973

Inventor(s) Kazuo Nezu, Ziro Imabayashi, Kazutaka Watanabe, Tadamitsu Iritani, Kouju Kataoka, Michio Yoshioka It is certified that error appears in the above-identified patent and that said Letters Patent are hereby corrected as shown below:

Column 4, line 30, "$SW_2$" should be--$SW_{21}$--;

Column 4, line 39, "1" should be lower case L --l--;

Column 7, line 60, after "Vc" insert --is--;

Column 7, line 60, delete "connected", second occurrence;

Column 8, line 15, "an" should be --and--;

Column 11, line 30, "Ir" should be --Tr--;

Column 11, line 38, "broght" should be --brought--.

Signed and sealed this 20th day of November 1973.

(SEAL)
Attest:

EDWARD M.FLETCHER,JR.
Attesting Officer

RENE D. TEGTMEYER
Acting Commissioner of Patents